(12) United States Patent
Langner

(10) Patent No.: US 8,500,003 B2
(45) Date of Patent: Aug. 6, 2013

(54) METHOD AND DEVICE FOR ACCESSING MICROFORMS

(75) Inventor: Klaus Langner, Oberdürenbach (DE)

(73) Assignee: Cybercity GmbH, Oberduerenbach (DE)

( * ) Notice: Subject to any disclaimer, the term of this patent is extended or adjusted under 35 U.S.C. 154(b) by 381 days.

(21) Appl. No.: 12/812,211

(22) PCT Filed: Jan. 8, 2009

(86) PCT No.: PCT/EP2009/050159
§ 371 (c)(1),
(2), (4) Date: Jul. 8, 2010

(87) PCT Pub. No.: WO2009/090134
PCT Pub. Date: Jul. 23, 2009

(65) Prior Publication Data
US 2010/0320267 A1    Dec. 23, 2010

(30) Foreign Application Priority Data

Jan. 14, 2008  (DE) .......................... 10 2008 004 403
May 5, 2008    (DE) .......................... 10 2008 022 162

(51) Int. Cl.
*G03B 23/00*         (2006.01)

(52) U.S. Cl.
USPC .......................................... 235/375; 353/25

(58) Field of Classification Search
USPC ................................................ 235/375, 454
See application file for complete search history.

(56) References Cited

U.S. PATENT DOCUMENTS

| | | | | |
|---|---|---|---|---|
| 3,645,619 A | * | 2/1972 | Burton et al. ................... | 355/40 |
| 4,213,040 A | | 7/1980 | Gokey et al. | |
| 4,557,595 A | * | 12/1985 | Freundt ........................... | 355/72 |
| 5,690,406 A | * | 11/1997 | Furukawa et al. .............. | 353/25 |
| 2007/0103739 A1 | | 5/2007 | Anderson et al. | |
| 2010/0165377 A1 | | 7/2010 | Has | |

FOREIGN PATENT DOCUMENTS

| | | |
|---|---|---|
| DE | 40 00 671 | 7/1990 |
| DE | 10 2006 014 043 | 10/2007 |
| EP | 1 684 199 | 7/2006 |
| WO | WO 00/28726 | 5/2000 |
| WO | WO 01/61626 | 8/2001 |
| WO | WO 01/61628 | 8/2001 |

* cited by examiner

*Primary Examiner* — Jamara Franklin
(74) *Attorney, Agent, or Firm* — Lucas & Mercanti, LLP

(57) ABSTRACT

A method for reading analogue and/or digital data, which are stored in fields on a microform, includes using a device for accessing the microform, which device is connected to a data processing system via a hardware interface. In order to make it possible to further process the data acquired by the device in a conventional personal computer, the analogue and/or digital data stored on the microform are represented by a control unit of the device of the data processing system as if the microform were a conventional replaceable data storage medium. Finally, the microform has a structure that allows the data stored thereon to be read quickly and is also suitable for the long-term and secure archiving of digital data.

12 Claims, 12 Drawing Sheets

METHOD AND DEVICE FOR ACCESSING MICROFORMS

CROSS REFERENCE TO RELATED APPLICATIONS

This is a U.S. national stage of application No. PCT/EP2009/050159, filed on 8 Jan. 2009. Priority is claimed on German Application No.: 10 2008 004 403.2 filed 14 Jan. 2008; and German Application No.: 10 2008 022 162.7 filed 5 May 2008, the content of which are incorporated here by reference.

BACKGROUND OF THE INVENTION

1. Field of the Invention

The invention pertains to a method at least for reading analog and/or digital data stored on a microform by the use of a device for accessing the microform which is connected to a data processing system by a hardware interface. The invention also pertains to a device for implementing the method and to a microform.

2. Description of the Prior Art

Microforms (microfilm, microfiche, and aperture cards) have been used since 1920 for the archival of documents. The number of microfiches alone existing in the world today is estimated at several billion. There are also a correspondingly large number of reading devices on the market. These are characterized in that the content stored on the microform is either presented to the observer directly on a matte glass screen or scanned by electronic methods and made visible by digitizing equipment.

Most of the data stored on microforms in the past has been in the form of copies of image and/or text documents. Conventional microfiches for storing analog data are usually designed according to the method described in DIN ISO 9923. The microfiche, which measures 105 mm×148 mm, is divided into two areas. The first area is reserved for a title field, which can be read by man and/or device. The second area is divided into a varying numbers of fields, each of which contains a reduced-size representation of any desired document in shades of gray (analog data). As listed in Table 1 below, the number of fields, depending on how the microfiche is divided, varies between 1 and 420:

TABLE 1

Division of a microfiche according to DIN ISO 9923.

| Number of Image Fields | Image Size[1] | Dimensions of Image Field[2] | Number of Rows | Number of Columns | Maxima 1 Width of Title Field | Lower Edge | Left Edge | Image No. |
|---|---|---|---|---|---|---|---|---|
| 49 | 87.5 × 140 | 12.5 × 20 | 7 | 7 | 12.25 | 4 ± 0.5 | 4 ± 0.5 | 3 |
| 98 | 87.5 × 140 | 10 × 12.5 | 7 | 14 | 12.25 | 4 ± 0.5 | 4 ± 0.5 | 3 |
| 270 | 93.75 × 139.5 | 6.25 × 7.75 | 15 | 18 | 6 | 4 ± 0.5 | 4 ± 0.5 | 4 |
| 420 | 93.75 × 140 | 5 × 6.25 | 15 | 28 | 6 | 4 ± 0.5 | 4 ± 0.5 | 5 |
| 1 | 95 × 133 | 95 × 133 | — | — | 8.25 | 0.5 ± 0.20 | 7.5 ± 0.25 | 6 |

[1] The image size does not include the title field.
[2] Single fields and double fields may be used on the same microfiche.

EP 1 684 199 A2 discloses a method for digitizing and displaying analog data stored on microfiches, in which the digitized data are sent to a text recognition software program. The digital data generated by the text recognition process are subjected to further processing in a data processing system.

DE 40 00 671 A1 discloses the use of microfilm as a storage medium for data. The data are stored as alphanumeric symbols on the microfilm in analog fashion. The microfilm is laid in a computer input microfilm reader, which scans the microfilm and converts the symbols stored in the microfilm into computer data. Text recognition software is used here, too, to accomplish the conversion. The text recognition process results in computer codes, which correspond to the symbols on the microfilm. These computer codes are transmitted by the reader to a data processing system via a computer interface.

U.S. Pat. No. 4,213,040 A describes a microfiche, on which digital or analog data are stored; the data are read by a scanner and sent as output via an interface to electronic circuits, which process the digital or analog data. The digital data are arranged line by line down the length of the microfiche card. Above and below the data area there is in each case an incremental code, which is evaluated by a scanner and a logic circuit. If the bits of the incremental upper and lower codes do not agree bit for bit, the sensor is aligned by the logic circuit, so that the data in their line-by-line arrangement can be read out correctly. In addition, the microfiche also has a horizontal bar above and another one below the data area; these bars mark the beginning and the end of the data. In the areas above and below the data area, furthermore, there are also centering marks, which are aligned with the data, which are arranged in rows and columns. The centering marks make it possible for the data to be addressed, the data within the data area always being in read out in their entirety.

One the main disadvantages of the known methods and devices for accessing microforms is that the data acquired by the scanners can be subjected to further processing only by special electronic circuits or in data processing systems equipped with special software. In addition, the known methods and devices allow access either only to microforms with analog data or only to microforms with digital data. Finally, the known digital microforms are not suitable for rapid access to the data.

SUMMARY OF THE INVENTION

An object of the invention is to provide a method at least for reading analog and/or digital data stored in fields on a microform and a device for implementing this method which make it possible to subject the data acquired by the device to further processing in a conventional personal computer. Further, an advantageous microform is to be provided, the data on which can be read out quickly and which, because of its design, is suitable for long-term, safe archiving of data, especially digital data.

The object is met by a method for reading at least one of analog and digital data stored in fields on a microform by means of a device for accessing the microform which is connected to a data processing system by a hardware interface, the method comprising reading, by a control unit of the device, the analog and/or digital data stored on the microform, and presenting, by the control unit, the analog and/or digital data stored on the microform to the data processing system as if the microform were a removable data storage medium.

The object is also met by a device for accessing a microform with at least one of analog and digital data stored in fields, the device comprising a unit for drawing the microform into a receiving slot of the device and ejecting the microform from the receiving slot, at least one scanning unit for scanning the microform received in the device, the scanning unit comprising at least one electromagnetic radiation source arranged on one side of the microform and at least one electronic sensor on an opposing side of the microform, said at least one electronic sensor converting the different degrees of transparency of the microfiche film of the microform to the electromagnetic radiation into electrical signals, and a program-controlled control unit configured to receive the at least one of analog and digital data stored on the microfilm acquired by the scanning unit and to present the at least one of analog and digital data stored on the microform to the data processing system (PC) in the form of data on a removable data storage medium.

If, in the method mentioned at the beginning, the analog and/or digital data stored on the microform are presented to the data processing system by the device's control unit as if the microform were a removable data storage medium, the device for accessing the microform can be connected directly to a conventional personal computer in the same way as a conventional external mass storage unit such as a CD-ROM or CD drive for removable data storage media. A comparison between the device for accessing the microform and a device for removable data storage media shows that both the number, meaning, and behavior of the electrical connections and also the software commands understood by the two devices and their response to these commands are the same.

A "removable data storage medium" is understood here to mean not a storage medium permanently installed in the data processing system but rather a replaceable, usually portable storage medium for personal computers, which serves in most cases as an additional medium for data storage in place of the otherwise conventional hard drive. Removable data storage media make it possible to remove the data from the personal computer for the purpose of data security or data exchange between non-networked personal computers.

The various types of removable data storage media can be derived from the following table:

TABLE 2

Types of conventional removable data storage media.

| Name | Storage |
| --- | --- |
| Diskette | magnetic |
| ZIP | magnetic |
| JAZ | magnetic |
| REV | magnetic |
| CD | optical |
| DVD | optical |
| Removable disk | magnetic |
| MO/MOD | magneto-optical |
| USB stick | flash EEPROM |
| Memory card (various formats) | flash EEPROM |

In the same way as can be done with conventional removable data storage media, the data on the inventive microforms can be displayed or further processed directly, such as printed out, transferred to other storage media, or displayed on a screen attached to the data processing system without any special software or adaptation of the data processing system.

If only analog data are stored on the microform and the microform comprises no format field, the content of the microform is first analyzed by scanning the microform present in the device to obtain the number of analog data fields and their arrangement. The control unit for the device for accessing the microform generates a file system from the data acquired by the scanning process and stores it in the memory of the control unit. The file system is preferably generated by first conducting a complete scan of the microform, preferably at low resolution, to determine the arrangement and number of analog data fields. As shown in Table 1, either the fields are arranged in a grid with a defined number of rows and columns, or there is only one field with analog data on the microform. As a result, there will be, for example, 1, 49, 98, 270, or 420 fields in which stored analog data can be present. Then, the file system of a removable data storage medium (e.g. UDF [Universal Disk Format, Optical Storage Technology Association]) is replicated in the memory of the device for accessing the microform, and entries of the form IMG__0001.tif to IMG__0420.tif or IMG__0001.jpg to IMG__0420.jpg are written into it.

On the arrival of a "read" command from the data processing system, the control unit checks to see whether the required data are already in the control unit's memory. With the help of the file system, the control unit determines which fields of the microform must be re-scanned and, in cases where the required data are not already present in the control unit's memory, executes the scan of the individual fields. The analog data such as photographic images acquired during the new scan of the individual fields are converted by the control unit into a data format compatible with the file system such as to the ".tif" format or the ".jpg" format and sent as output to the data processing system. A personal computer connected by the hardware interface to the device for accessing the microform will, on receiving a "read" command, first recognize this file system and then, either automatically or by user input, request one or more of the files identified by the previously mentioned entries.

If the data stored on the microform are exclusively digital, the device for accessing the microform must have information on the structure and type of data storage. The control unit reads information on the structure and type of data storage from a format field identifiable on the microform and from at least one of the fields with digital data. Information on locating the files stored on the microform such as the file name and its attributes, which give more detailed information on the file, can be found in the at least one digital data field. The attributes can consist, for example, of physical addresses such as block and sector numbers. From the information read out from the format field and the at least one digital data field, the control unit generates a file system corresponding to a removable data storage medium and stores it in the control unit's memory.

When a "read" command is received, the digital data acquired during the following scanning of the individual fields of a microform with a format field are sent as output to the data processing system in the manner defined by the file system.

The format field is identified by the use of pattern recognition methods known in and of themselves, which identify, for example, a double frame surrounding the format field. Fields with data do not have this double frame. The reading speed can be increased considerably if the format field is always arranged in the same place on the microform, because then only the standardized area where the format field of the microform is located needs to be scanned first. The location of the format field can be specified in any desired way. For example, it can be in the upper left corner of the microform. The scanning process for reading the format field takes place at a first resolution which corresponds to the density of the data in the format field, which is preferably lower than the resolution for the following scan of the individual fields containing digital data.

The standardization of the information on the structure and type of data storage in the format field in a defined position on the microform makes it possible for a first-generation device for accessing the microform to read more highly evolved, future versions of these types of microforms, especially versions with higher data densities in the data fields, provided that the scanning unit comprises a resolution corresponding to the increased data density.

The inventive method also allows the processing of microforms on which both analog and digital data are stored, also called below "hybrid" microforms in brief. These hybrid microforms also comprise a uniquely identifiable format field, which is read out by the control unit. The hybrid microform eliminates the restriction that only analog or only digital data can be stored on a single microform. Any desired type of digital data such as programs, text documents, digital photos, and audio and multimedia files can be stored together with conventional analog image documents for very long periods of time (500 years or more) and easily retrieved.

If the microform contains both analog and digital data, the control unit can, insofar as the analog data are concerned, generate the file system corresponding to a removable data storage medium as described above, and, insofar as the digital data are concerned, it can generate the file system on the basis of the information in the format field and in at least one additional field with digital data, as described above, and then store these file systems in the control unit.

Finally, the inventive method also makes it possible to process microforms on which exclusively analog data are stored but which also comprise a format field. From the format field identifiable on a microform of this type, the control unit reads information concerning the arrangement and number of fields with analog data, generates from this information a file system corresponding to a removable data storage medium, and stores this in the control unit's memory.

The device for accessing the microform makes it possible to implement the method so that at least one of the previously mentioned types of microforms can be accessed, preferably, however, so that all types can be accessed (microforms with exclusively analog data with or without a format filed, microforms with exclusively digital data, and hybrid microforms).

In one embodiment of the inventive method, it is provided that data can be written to the microform in such a way that, after the writing process, the analog and/or digital data written to the microform can be presented by the control unit of the device to the data processing system (PC) as if the microform were a removable data storage medium. For this purpose it is necessary for the data to be written to the fields specifically for analog and/or digital data and, in the case of a microform with digital data or with digital and analog data, it is also necessary for a format field and the other information on the file system to be written to at least one of the digital data fields.

A laser mounted on the scanning device can be used, for example, to write the data on the film material. When a "write" command is received from the data processing system, the control unit checks to see whether a writable microform is present in the device, and if this is the case, the control unit takes the data transferred from the data processing system to the device and writes it onto the microform in conformity with the file system.

An inventive microform for digital and/or analog data preferably comprises a format field, identifiable by a scanning unit, containing information on the structure and type of data storage and at least one or more fields for the storage of digital and/or analog data. At least in certain areas, the data storage fields have the same size and are arranged in rows and columns in a grid.

To facilitate the automatic detection of the format field, the format field is preferably always located in the same place, especially in the upper left corner of the grid.

A hybrid microform comprises both fields for the storage of digital data arranged in sequence in rows or columns and fields for the storage of analog data, also arranged in sequence in rows or columns. The format field contains at least structure information on the position of the individual fields on the microform, on the number of fields, on the number of columns and rows of the data cells of each field for the storage of digital data, on the location of the first field with analog data, and on the size of the data blocks addressable in the fields for the storage of digital data. Concerning the type of data storage, parameters which establish whether the digital data are stored as black levels/transparency or as gray scale values are recorded in the format field.

BRIEF DESCRIPTION OF THE DRAWINGS

An exemplary embodiment of the invention is described in greater detail below.

DETAILED DESCRIPTION OF THE PREFERRED EMBODIMENTS

1. Structure of the Device

Figure 1A:
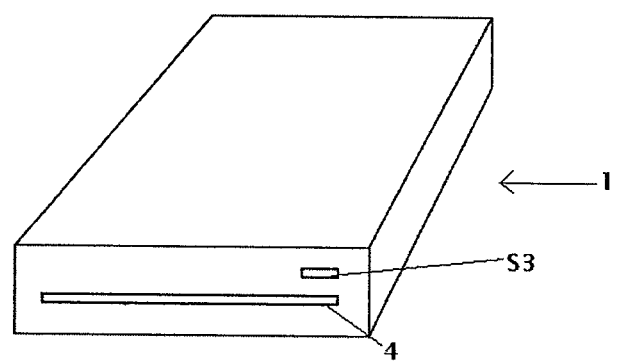
FIG. 1a shows a front perspective view of a device for accessing a microform.
Figure 1B:
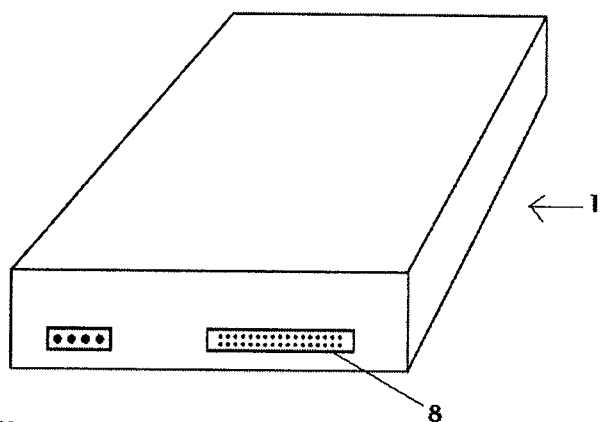
FIG. 1b shows a rear perspective view of the device according to FIG. 1.
Figure 2:
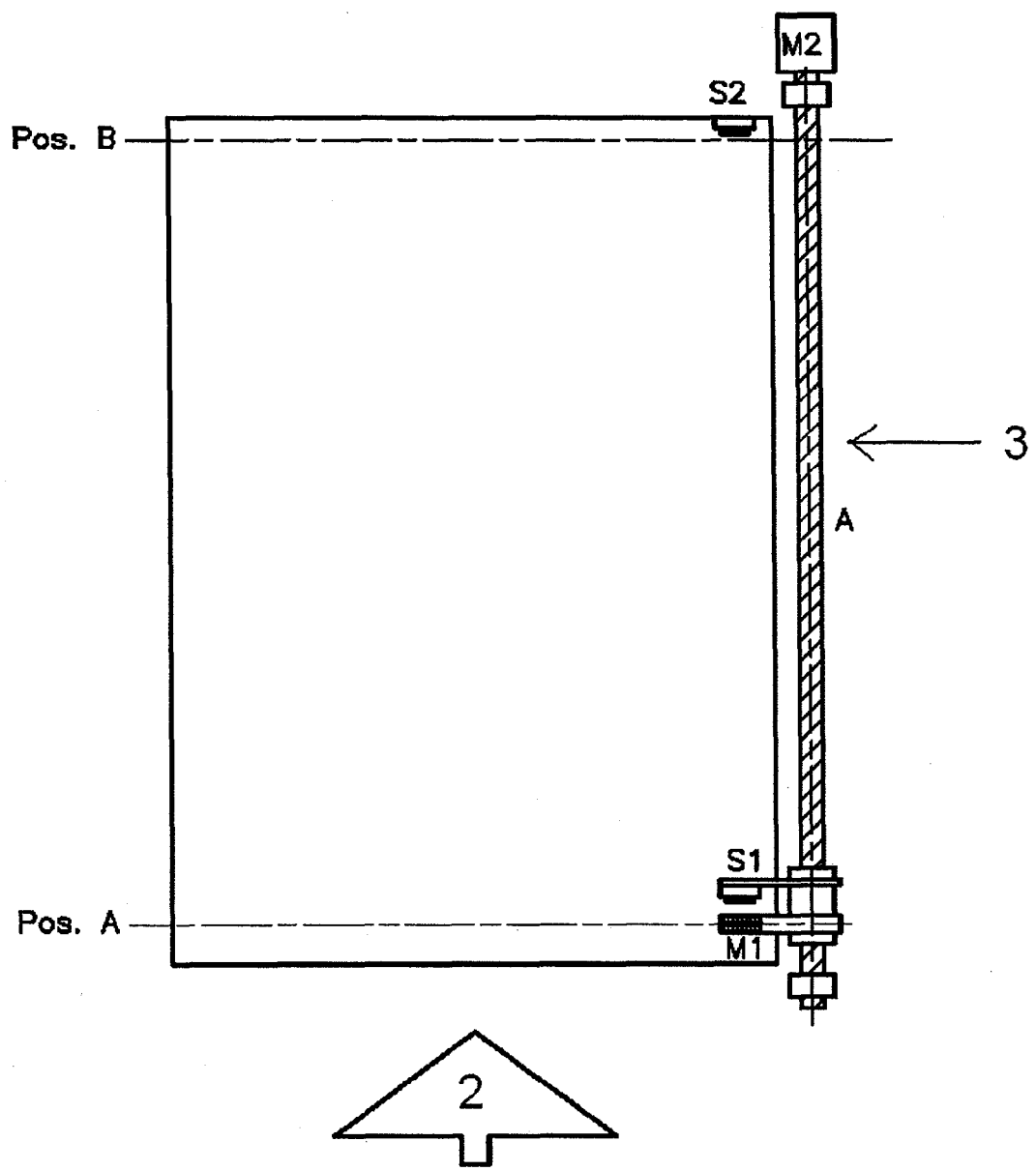
FIG. 2 shows a top view of a unit of the device according to FIG. 1 for drawing in and ejecting a microform.
Figure 3:
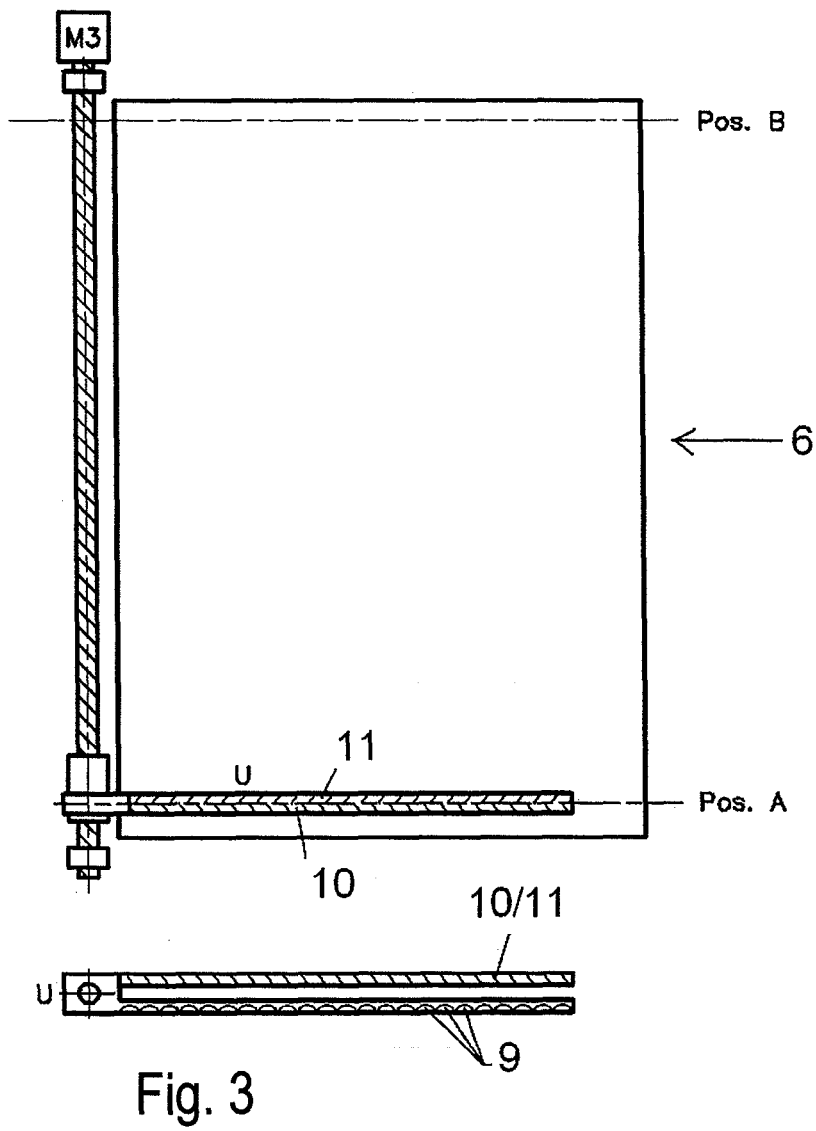
FIG. 3 shows a top view of a scanning/writing unit of a device according to FIG. 1, and a side view of a read-write tray.
Figure 4:
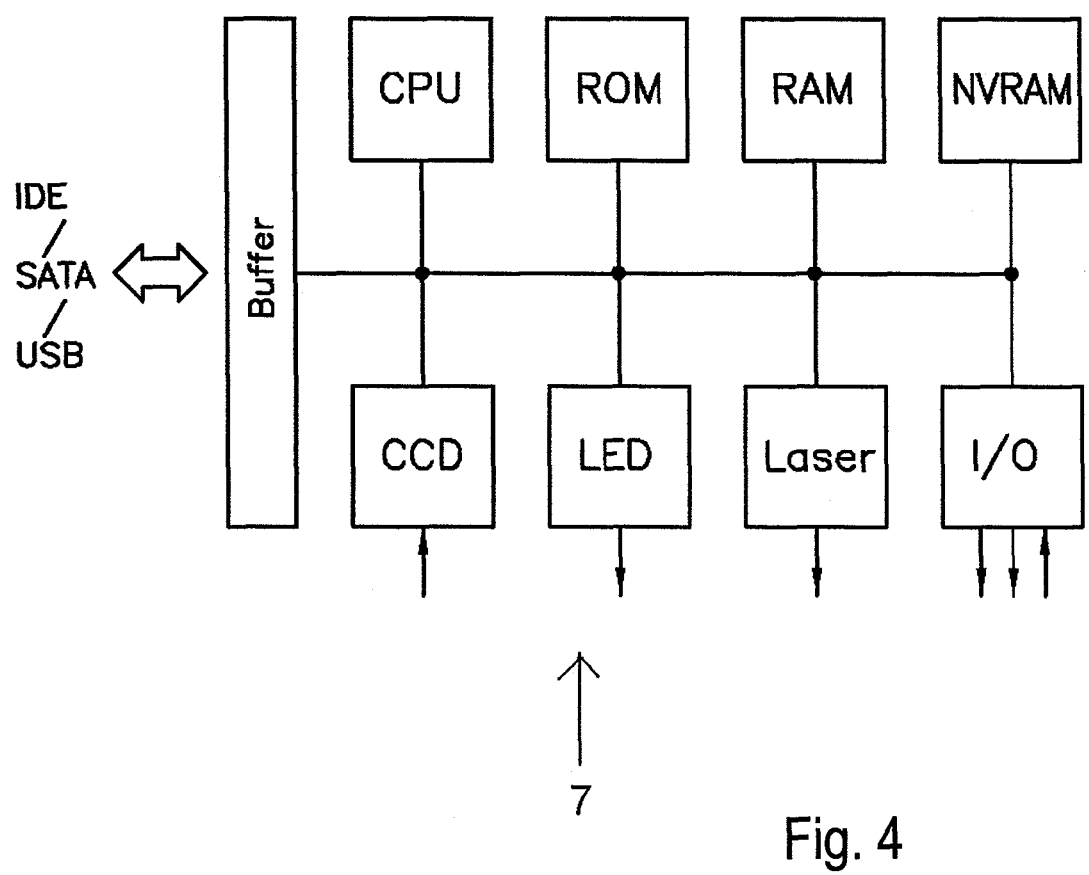
FIG. 4 shows a functional block diagram of a control unit of the device according to FIG. 1.
Figure 10:
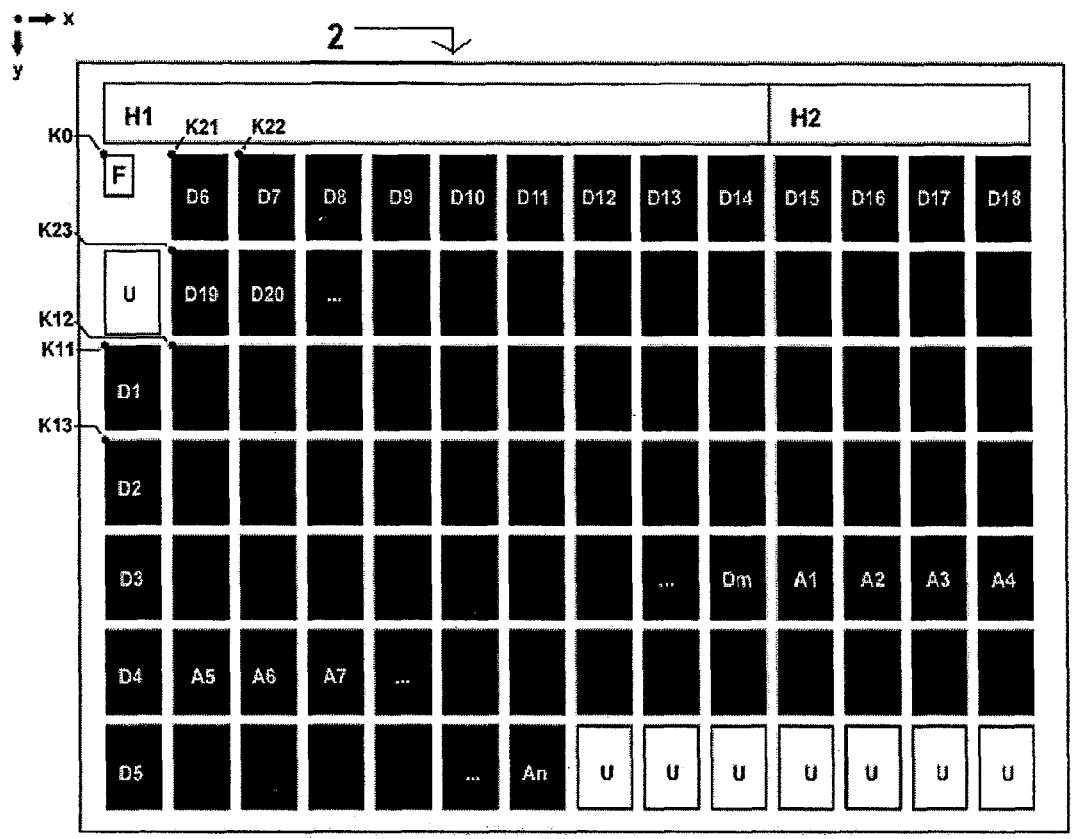
FIG. 10 shows a top view of a hybrid microform.

FIGS. 1a and 1b show a device 1 for accessing a microform 2 (see, e.g., FIG. 10). The device 1 consists essentially of:

a unit 3 for drawing in and ejecting a microform 2 with a feed slot 4 for the microform 2, which can be ejected by an eject button S3 (FIG. 2);

a scanning/writing unit 6 for performing a scan or a write process on the microform 2 present in the device 1 (FIG. 3); and a program-controlled control unit 7, which presents the analog and/or digital data stored on the microform 2 and acquired by the scanning unit 6 to a data processing system connected to the device 1 by a hardware interface 8 as if the microform 2, which can be drawn into the receiving slot 4, were a removable data storage medium (FIG. 4).

(a) Unit 3 for Drawing In and Ejecting a Microform 2:

The unit 3 has the job of drawing the microform 2 into the device 1 and of ejecting it again. By means of an optional tray, not shown in FIG. 1a, at the receiving slot 4, various microform formats (e.g., flat microfilm (microfiche), aperture cards, and 35-mm film strips (the latter possibly on a carrier)) can be introduced as desired. When the microform 2 is introduced into the receiving slot 4, a contact of a microswitch S1 located directly behind the slot opening is actuated; the microswitch activates a magnetically actuated holder, called "magnetic holder M1" below. This accepts the microform 2 and pulls it into the receiving slot 4 of the device 1 by means of a motor M2, which drives a worm shaft A, until the area of the microform 2 to be scanned is located in the processing area of the scanning/writing unit 6 (FIG. 3).

By actuating the eject button S3 or in response to a control command from the control unit 7, the microform 2 is ejected by the reversal of the rotational direction of the motor M2.

(b) Scanning/Writing Unit 6:

The scanning/writing unit 6 consists of a U-shaped slide U, one side of which carries a linear array of radiation sources 9, e.g., in the form of LEDs, whereas the other side carries an electronic sensor 10, e.g., a linear CCD (charge-coupled device). The slide U is moved across an area of the microform 2 to be scanned by a worm shaft B, driven by a motor M3. The linear array of radiation sources 9 preferably has a brightness control, so that the brightness can be adjusted to the degree of transparency of the microform 2 to light. Both the linear array of radiation sources 9 and the sensor 10 in the form of a linear CCD are operated by way of the control unit 7.

In addition, the slide U can have the ability to rotate the radiation sources 9 and the sensor 10 relative to the microform 2, so that they can be adjusted optimally to the position of the data to be read.

In the exemplary embodiment shown here, the device 1 is equipped not only with a scanning unit but also with an optional writing unit in the form of lasers 11, so that data can be recorded on writable microforms 2. As shown in the side view of FIG. 3, it is advisable for the writing unit to be mounted on the same slide U as the scanning unit. The lasers 11 are arranged parallel to the sensor 10.

(c) Program-Controlled Control Unit 7:

The control unit 7 consists of an arrangement of semiconductor circuits with components according to FIG. 4.

The essential task of the program-controlled control unit 7 is to convert the analog and/or digital data stored on the microform 2 and acquired by the scanning/writing unit 6 to a format which makes it possible for these data to be presented to a data processing system, especially a personal computer connected to the device 1, in such a way that the microform 2 which can be drawn into the receiving slot 4 appears to be a conventional removal data storage medium.

The following components are used for this purpose:

a microcontroller with a central processing unit CPU; a read-only memory ROM; a working memory RAM, which serves simultaneously as the memory for the data to be read in from the microform and for the file system; and a nonvolatile, rewritable memory NVRAM for the control program of the control unit 7;

a peripheral component CCD for reading the sensor signals, especially the acquired brightness or color values from the sensor 10 of the scanning/writing unit 6; for assigning these values to the reading location at the time in question; and for storing them in the working memory RAM;

a peripheral component LED for controlling the brightness of the at least one electromagnetic radiation source 9;

a peripheral component I/O for controlling the unit 3 for drawing in and ejecting the microform and the drive M3 for moving the scanning/writing unit 6; and a peripheral component LASER for controlling the writing unit 11 of the scanning/writing unit 6.

The rewritable memory NVRAM makes it possible to update the device code so that, for example, new storage formats can be supported.

The previously mentioned peripheral components of the control unit 7 serve to read in the sensor signals and to control the motors, the scanning unit, and the writing unit.

To control the unit 3 for drawing in and ejecting the microform 2 and the drive M3 for moving the scanning/writing unit 6, the peripheral component I/O reads the status of the microswitches S1 (microform inserted), S2 (write/read slide U in the end position, position B), and S3 (eject button); it also has outputs for driving the magnetic holder M1 and for controlling the motors M2 (microform insert/eject) and M3 (movement of the read/write slide U).

The control program of the control unit 7 is responsible for ensuring that the scanning/writing unit 6 and the hardware interface 8 with the data processing system interact properly.

2. Control Program

Figure 5:
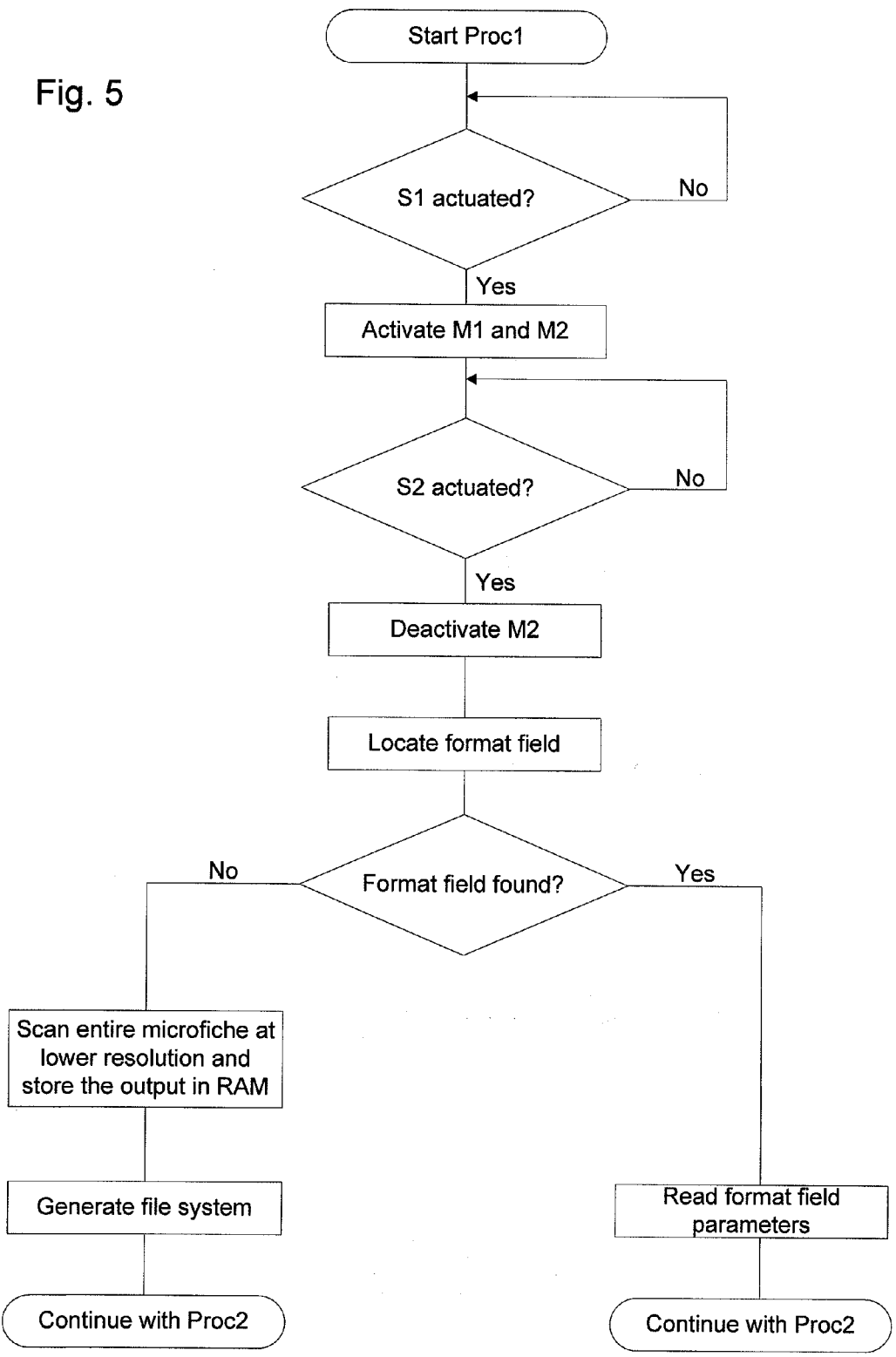
FIG. 5 shows a flow chart of the control program for initializing the device.
Figure 6:
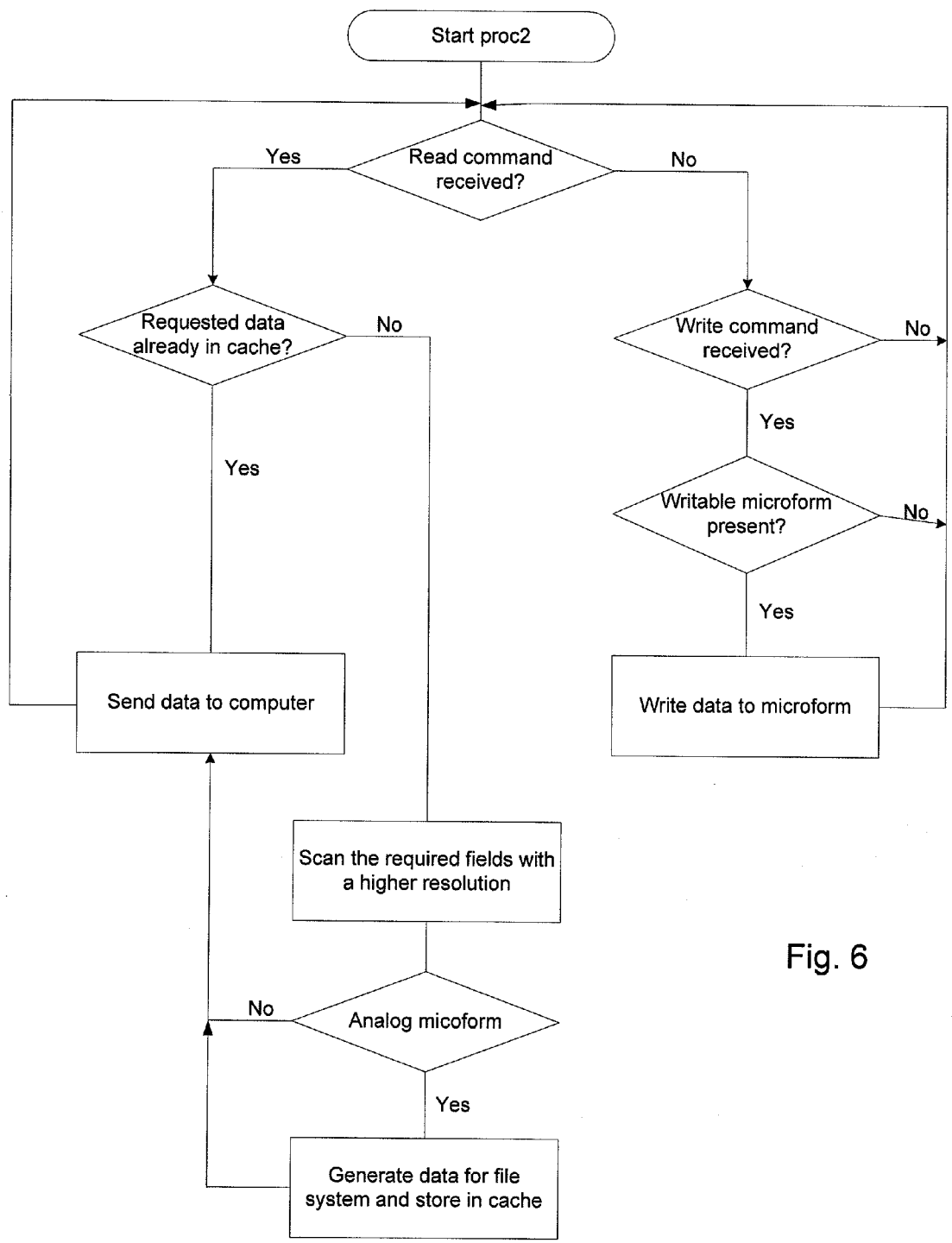
FIG. 6 shows a flow chart of the control program for a read/write cycle of the device.
Figure 7:
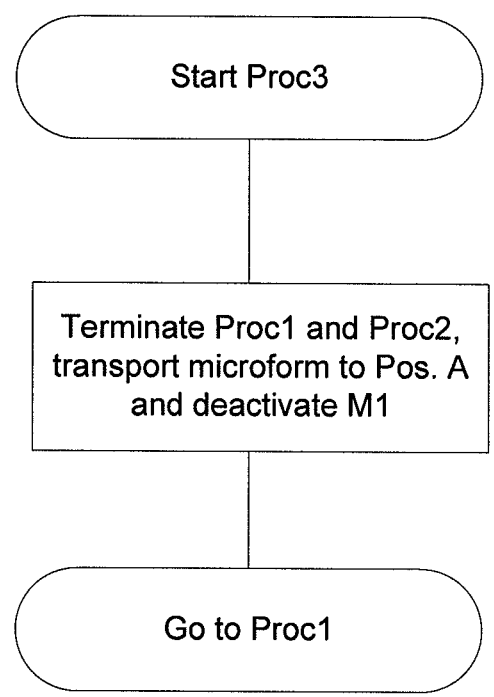
FIG. 7 shows a flow chart of the control program for an output cycle of the device.

FIGS. 5-7 show flow charts of the control programs for initialization, for a write/read cycle, and for an ejection cycle:

When the device is turned on, the procedure "Proc1" begins (FIG. 5) by checking the status of the microswitch S1. This switch is actuated by pushing a microform 2, e.g., a microfiche 2, into the device 1. Thus the magnetic holder M1, which firmly holds the microfiche in place and is connected to the worm shaft A, is activated, and the motor M2 starts to turn worm shaft A, as a result of which the magnetic holder M1 and the microfiche 2 are pulled toward the microswitch S2. When the microfiche 2 has arrived at the end position, i.e., "Position B", it actuates the microswitch S2, whereupon the motor M2 is turned off.

Now the microfiche 2 is scanned at a first, preferably high resolution by the opto-electronic sensor 10 in the form of the linear CCD array. For this purpose, the motor M3 drives the slide U extending over both sides of the microfiche 2 into the area of the microfiche 2 in which the format field F (see FIG. 8, A1 and FIG. 9) of a microform for digital data or a hybrid microform or possibly even a microform for analog data with a format field F is located. The format field F is sought out and identified on the microfiche 2 by means of conventional pattern recognition methods of digital image processing. In this exemplary embodiment, the format field F (see FIG. 9) comprises a characteristic double frame with lines of different thicknesses, and the first line WO always contains the same bit pattern.

If no format field F is found, the control unit 7 of the device 1 assumes that the inserted microform 2 is a conventional analog microfiche with exclusively analog data in its fields and without a format field and performs a scan of the entire microfiche at a resolution preferably lower than that of the first partial scan by moving the slide U of the scanning/writing unit 6 over the entire length of the microfiche 2 present in the device and stores the output in the NVRAM. During the scanning process, conventional pattern recognition methods are used to determine the number and size of the fields with analog data (image fields). According to DIN ISO 9923, the microfiche can hold 49 (7×7), 98 (7×14), 270 (15×18), or 420 (15×28) image fields or a single image extending over the entire microfiche. A file system is then generated on the basis of this complete scan. In the file system, these image fields are represented as follows by way of example:

TABLE 3

File system for analog data

| File Name | Meaning |
|---|---|
| IMG_0000.TIF | image data of all image fields in low resolution |
| IMG_0001.TIF | image data of image field 1 in high resolution |
| . | . |
| . | . |
| . | . |
| IMG_nnn.TIF | image data of image field nnn in high resolution |

If a format field F is found during the first partial scan, then what is present is a microform 2 with digital data or a hybrid microform or possibly even a microform for analog data with a format field F. This format field F is then read; and, in the case of a microform 2 with digital data or a hybrid microform, at least one of the digital data fields is also read and the file system is generated. For a microform 2 with digital data or a hybrid microform, the information on the structure and type of data storage is stored as parameters W1-W3 in the format field F on the microform 2 and usually also in the first digital data field (compare field D1 in FIG. 10). The parameters are explained in greater deal below on the basis of FIG. 10.

Both for microforms with a format field and also for those without a format field, the program sequence of the control program continues with a read cycle according to the procedure "Proc2", the flow chart of which is shown in FIG. 6.

The device 1 waits for a start command from a connected data processing system, especially from a personal computer PC. If the command is a "read" command, the program first checks to see if the requested data are already in the cache (a part of the main memory RAM of the control unit 7). If yes, the data are sent to the personal computer. If no, the control unit 7 determines which fields with analog or digital data must be scanned by the scanning/writing unit 6 and then executes the scan.

If the microform contains digital data or if it is hybrid microform or is a microform with exclusively analog data and a format field (which is known as a result of Proc1—FIG. 5), the data are sent as output in correspondence with the file system.

If data from a microform with exclusively analog data are read, the analog data not yet present in the cache are converted to a data format such as JPG or TIF which conforms to the generated file system. These data calculated by the control unit 7 are then sent as output to the personal computer PC.

If the control command is a "write" command and if a writable microform 2 is present in the device 1, the data are written to the microform 2 by the laser 11.

The procedure "Proc2" is terminated by actuation of the eject button S3, which is communicated to the control unit 7 by, for example, a hardware interrupt, and the program then branches to procedure "Proc3", the flow chart of the which is shown in FIG. 7:

After actuation of the eject button S3, any initialization processes of Proc1 or read/write processes of Proc2 which are still active are terminated. The motor M2 transports the microform 2 out of the receiving slot 4 and switches the magnetic holder M1 off, so that the microform 2 is released and can be removed from the device 1.

3. Design of the Microform

The device 1 is able to scan not only microforms 2 with analog data but also those with digital data as well as hybrid microforms. In the following, a hybrid microform 2, designed as a microfiche with digital and analog data stored in fields and with the format field F, will be described in greater detail. The format field F can, of course, also be used for other microforms such as aperture cards.

So that a hybrid microform 2 can be scanned and read, the control unit 6 of the device 1 must be able to acquire information on the structure and type of data storage on the microform 2, especially on the recording method and the position and density of the digitally stored data. This information must be recorded on the microform 2 in such a way that it can be clearly identified.

Figure 8:
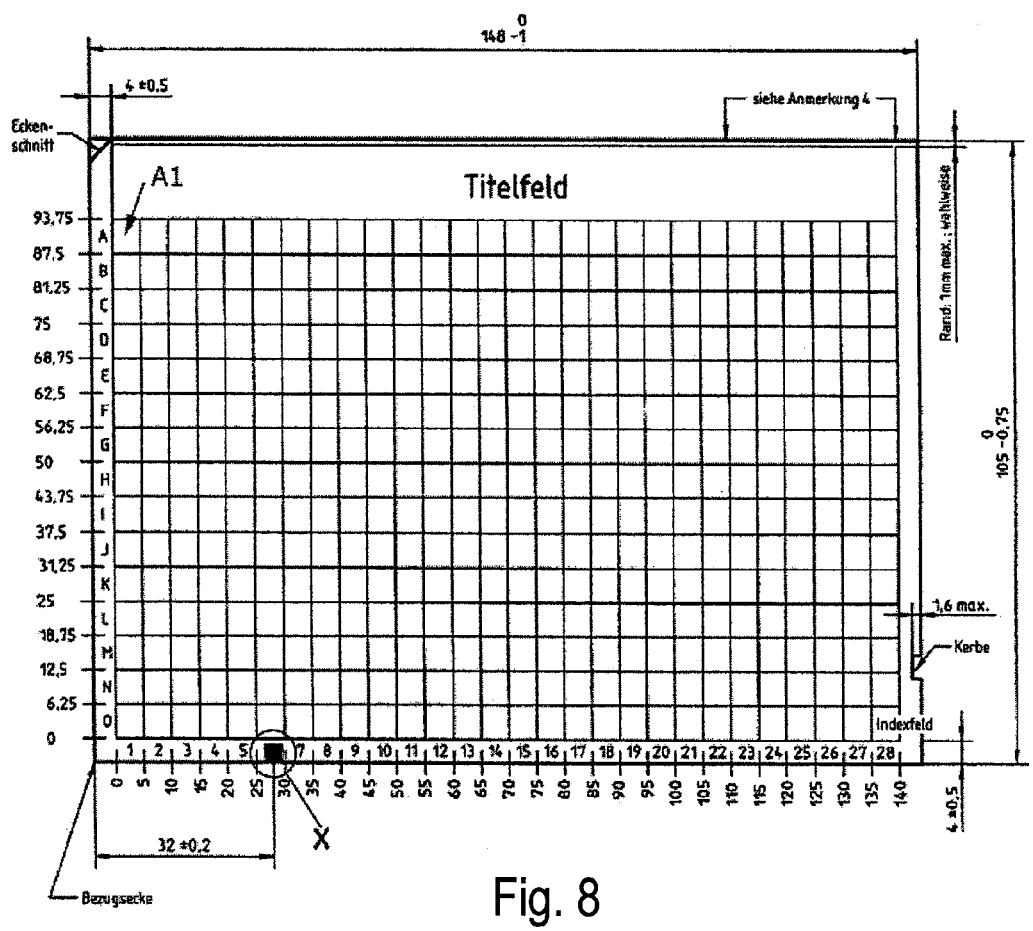
FIG. 8 shows a diagram of a microfiche according to DIN ISO 9923 to illustrate the position of the format field.
Figure 9:
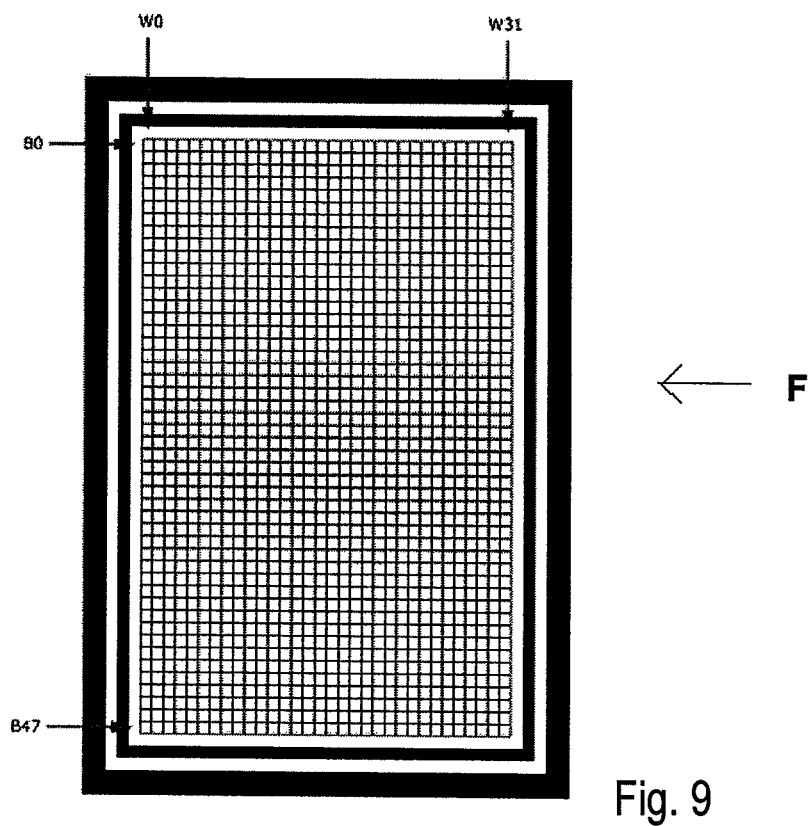
FIG. 9 shows an enlarged diagram of the format field.

A microform with exclusively digital data or a hybrid microform or even a microform with exclusively analog data comprises, as already mentioned above, a format field F, which can be clearly recognized and evaluated because of the way in which it is designed. In FIG. 8, this condition is fulfilled by a fixed localization of the format field F at the site A1 in the upper left corner of a microfiche as specified in DIN ISO 9923 (with 420 image fields) and by its defined form:

In the area of format field F shown enlarged in FIG. 9, a matrix is provided, which consists of 32×48 pixels. This matrix is used to store 32 digital values (parameters) W0 to W31, each with a length of 32 bits. The matrix cells B0-B31 are used to store the value in question (parameter). The other 32×16 bits (matrix cells B32-B47) are used to store redundancy data for error recognition and correction.

By defining the parameters for the formatting of the format field F and by retaining these definitions for all digital data microforms and hybrid microforms, the device 1 will also be able to process microforms developed in the future after further technical advances. The way in which the stored contents are presented to the connected personal computer PC remains the same because the same file system is used and guarantees that the data can always be read out reliably, which is important precisely with respect to long-term archival tasks. A logical '1' is characterized in format field F by opaque (dark) matrix cell B0-B31, a '0' by a transparent cell.

An inventive hybrid microform has the appearance shown in FIG. 10, wherein the designations and meanings of the abbreviations given in FIG. 10 can be derived from the following table:

TABLE 4

Abbreviations for the hybrid microform according to FIG. 10.

| H1 | header field 1 | Contains a human-readable title. |
|---|---|---|
| H2 | header field 2 | To hold a barcode, for example. |
| F | format field | Information on the structure and type of data storage. |
| D1 ... Dm | data fields 1 ... m | Fields containing digital data (digital fields). |

TABLE 4-continued

Abbreviations for the hybrid microform according to FIG. 10.

| | | |
|---|---|---|
| A1 ... An | analog fields 1 ... n | Fields containing analog data (analog fields). |
| U | unused | Fields without data. |
| K0 | K0 coordinates | Position of the coordinate cross of the format field. |
| K11 | K11 coordinates | Position of the coordinate cross of the first data field in area 1. |
| K12 | K12 coordinates | Position of the coordinate cross of the next data field in area 1 in the x direction. |
| K13 | K13 coordinates | Position of the coordinate cross of the next data field in area 1 in the y direction. |
| K21 | K21 coordinates | Position of the coordinate cross of the first data field in area 2. |
| K22 | K22 coordinates | Position of the coordinate cross of the next data field in area 2 in the x direction. |
| K23 | K23 coordinates | Position of the coordinate cross of the next data field in area 2 in the y direction. |

"Area 1" is the name for an arrangement of data fields spreading over an area established by the coordinates K11, K12, K13 and by the number of data fields in the x and y directions. The numbering of the data fields in area 1 begins with 1 in the x direction at the data field determined by K11 and then advances line-by-line.

"Area 2" is the name for an arrangement of data fields spreading over an area established by the coordinates K21, K22, K23 and by the number of data fields in the x and y directions. The numbering of the data fields in area 2 begins with the number of the last data field in area 1 plus 1. Values (parameters) in format field F establish the number of data fields over which areas 1 and 2 extend. The data fields D1 ... m may not overlap.

The format field F of a hybrid microform according to FIG. 10 carries the following content in the first two 32-bit values (parameters):

TABLE 5

Format field, part 1.

| No. | Name | Meaning | Value | Bits |
|---|---|---|---|---|
| 0 | SYNC | synchronization | binary 10000000000000001111000000000000001 | 32 |
| 1 | FMT | physical recording format | e.g. 0 = invalid, 1 = black/white; 2 = 16 shades of gray, ... | 32 |

The parameter SYNC always has a constant value and works together with the framing (see FIG. 9) to identify the location of the format field.

The parameter FMT defines the type of data storage and the format of the following parameters within the format field:
FMT 0 invalid,
  1 microfiche on which the digital data are stored by black levels or transparency,
  2 microfiche on which the digital data are stored in 16 shades of gray (one pixel corresponds to 4 bits).

If FMT=1 or 2, the following definitions for additional parameters of the format field apply:

TABLE 6

Format field, part 2.

| No. | Name | Meaning | Unit | Value Range | Bits |
|---|---|---|---|---|---|
| 2 | DK11X | distance from $K11_x$ to $K0_x$ | nanometer | 0 ... 140,000,000 | 32 |
| 3 | DK11Y | distance from $K11_y$ to $K0_y$ | nanometer | 0 ... 95,000,000 | 32 |
| 4 | DK12X | distance from $K12_x$ to $K11_x$ | nanometer | 0 ... 140,000,000 | 32 |
| 5 | DK13Y | distance from $K13_y$ to $K11_y$ | nanometer | 0 ... 95,000,000 | 32 |
| 6 | DK21X | distance from $K21_x$ to $K0_x$ | nanometer | 0 ... 140,000,000 | 32 |
| 7 | DK21Y | distance from $K21_y$ to $K0_y$ | nanometer | 0 ... 95,000,000 | 32 |
| 8 | DK22X | distance from $K22_x$ to $K21_x$ | nanometer | 0 ... 140,000,000 | 32 |
| 9 | DK23Y | distance from $K23_y$ to $K21_y$ | nanometer | 0 ... 95,000,000 | 32 |
| 10 | N1X | number of fields in area 1, x direction | numerical value | 0 ... 255 | 32 |
|  | N1Y | number of fields in area 1, y direction | numerical value | 0 ... 255 |  |

TABLE 6-continued

Format field, part 2.

| No. | Name | Meaning | Unit | Value Range | Bits |
|---|---|---|---|---|---|
|  | N2X | number of fields in area 2, x direction | numerical value | 0 ... 255 |  |
|  | N2Y | number of fields in area 2, y direction | numerical value | 0 ... 255 |  |
| 11 | LPF1 | lines per data field in area 1 | numerical value | 0 ... 4,294,967,295 | 32 |
| 12 | CPF1 | columns per data field in area 1 | numerical value | 0 ... 4,294,967,295 | 32 |
| 13 | GX1 | distance to the next field (X) in area 1 | numerical value | 0 ... 65,535 | 32 |
|  | GY1 | distance to the next field (Y) in area 1 | numerical value | 0 ... 65,535 |  |
| 14 | LPF2 | lines per data field in area 2 | numerical value | 0 ... 4,294,967,295 | 32 |
| 15 | CPF2 | columns per data field in area 2 | numerical value | 0 ... 4,294,967,295 | 32 |
| 16 | GX2 | spacer lines to the next field (X) in area 2 | numerical value | 0 ... 65,535 | 32 |
|  | GY2 | spacer columns to the next field (Y) in area 2 | numerical value | 0 ... 65,535 |  |
| 17 | SP1 | sector size in area 1 | bytes | 432 ... 65,535 | 32 |
|  | SP2 | sector size in area 2 | bytes | 432 ... 65,535 |  |
| 18 | FAFN | first field number with analog data | numerical value | 0 ... 65,535 | 32 |
|  | FUFN | first field number without data | numerical value | 0 ... 65,535 |  |
| 19 |  | reserved |  |  | 32 |
| . |  | . |  |  | 32 |
| . |  | . |  |  |  |
| . |  | . |  |  |  |
| 31 |  | reserved |  |  | 32 |

The digital data are arranged sector by sector, beginning with field D1.

Figure 11:
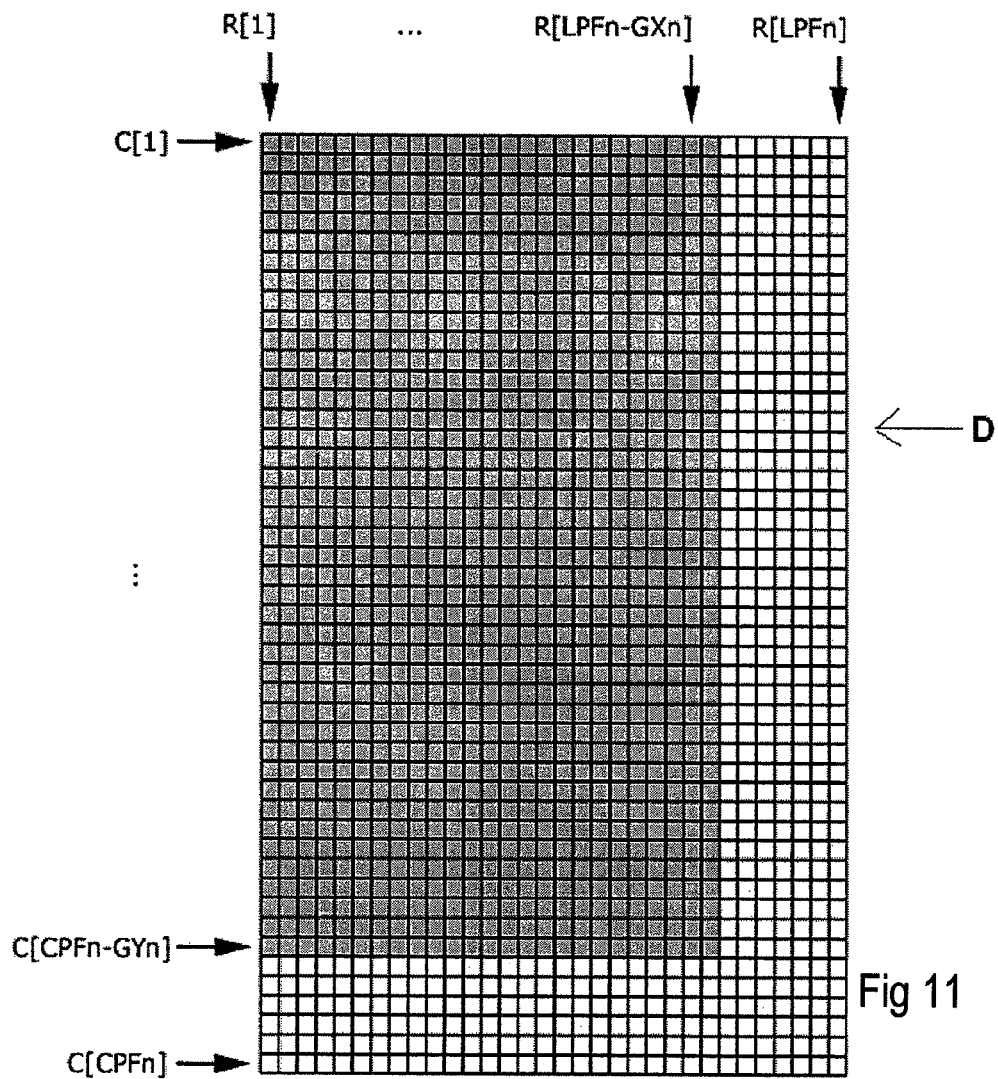
FIG. 11 shows an enlarged diagram of a field for digital data.

Each of the data fields D comprises the structure recognizable in FIG. 11. Each data field D is divided into columns C and rows R. The rows are vertical when seen in the normal viewing direction, whereas the columns are horizontal. Marked in gray in FIG. 11 are the data cells which contain the actual digital data. The white cells of the matrix are the "spacer lines" and "spacer columns' as listed at No. 16 in Table 5.

LPFn, GXn, CPFn, and GYn, where n=(1, 2), correspond to the parameters of the format field F, which are derived from the serial numbers 11., 14., 13., 16., 12., and 15. of Table 5.

Figure 12:
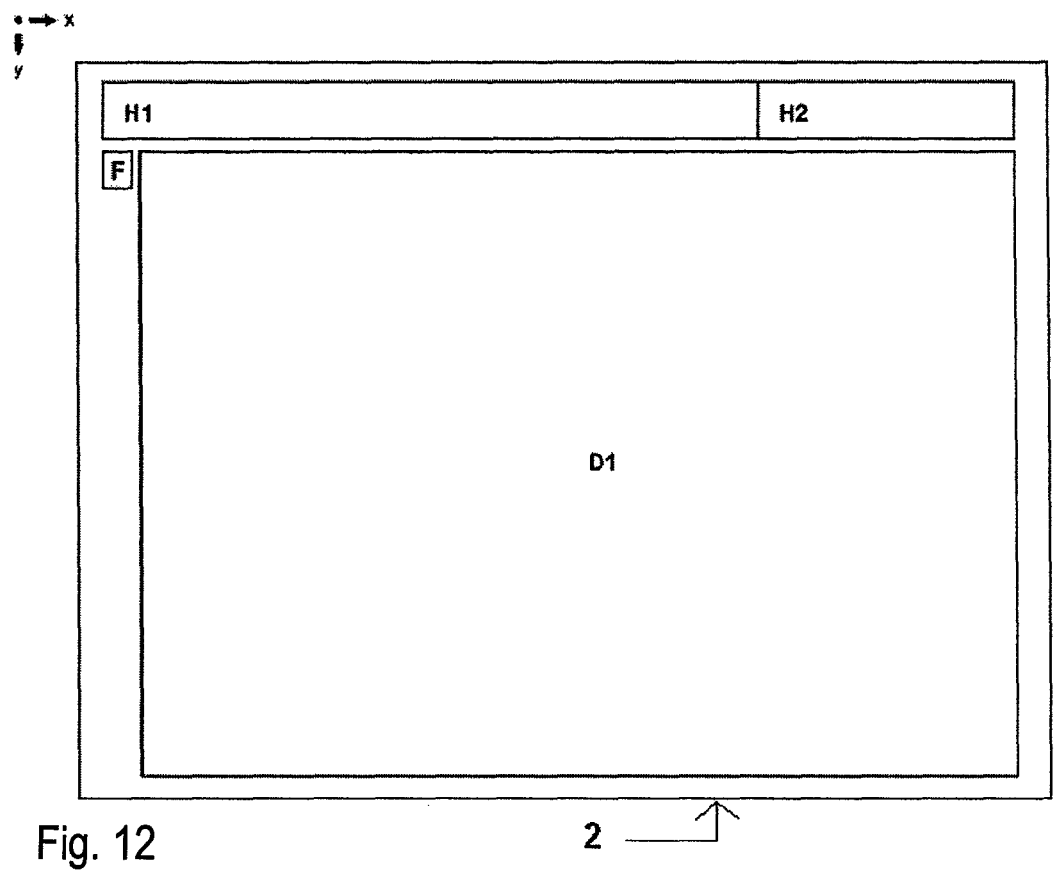
FIG. 12 shows a top view of a microform for the storage of digital data with one data field.

For the simple exemplary embodiment of an inventive microform 2 with a format field F and only one data field D1 for the storage of exclusively digital data shown in FIG. 12, the following concrete values for the parameters of the format field according to Table 5 are used as the basis:

TABLE 7

Exemplary embodiment of a format field for a microform according to FIG. 12.

| No. | Name | Meaning | Unit | Value Range | Bits |
|---|---|---|---|---|---|
| 2 | DK11X | distance from $K11_x$ to $K0_x$ | nanometer | 5,000,000 | 32 |
| 3 | DK11Y | distance from $K11_y$ to $K0_y$ | nanometer | 0 | 32 |
| 4 | DK12X | distance from $K12_x$ to $K11_x$ | nanometer | 134,937,500 | 32 |
| 5 | DK13Y | distance from $K13_y$ to $K11_y$ | nanometer | 88,900,000 | 32 |
| 6 | DK21X | distance from $K21_x$ to $K0_x$ | nanometer | 0 | 32 |
| 7 | DK21Y | distance from $K21_y$ to $K0_y$ | nanometer | 0 | 32 |
| 8 | DK22X | distance from $K22_x$ to $K21_x$ | nanometer | 0 | 32 |
| 9 | DK23Y | distance from $K23_y$ to $K21_y$ | nanometer | 0 | 32 |
| 10 | N1X | number of fields in area 1, x direction | numerical value | 1 | 32 |
|  | N1Y | number of fields in area 1, y direction | numerical value | 1 |  |
|  | N2X | number of fields in area 2, x direction | numerical value | 0 |  |
|  | N2Y | number of fields in area 2, y direction | numerical value | 0 |  |
| 11 | LPF1 | lines per data field in area 1 | numerical value | 6,800 | 32 |
| 12 | CPF1 | columns per data field in area 1 | numerical value | 4,480 | 32 |
| 13 | GX1 | distance to the next field (X) in area 1 | numerical value | 0 | 32 |
|  | GY1 | distance to the next field (Y) in area 1 | numerical value | 0 |  |
| 14 | LPF2 | lines per data field in area 2 | numerical value | 0 | 32 |
| 15 | CPF2 | columns per data field in area 2 | numerical value | 0 | 32 |

TABLE 7-continued

Exemplary embodiment of a format field for a microform according to FIG. 12.

| No. | Name | Meaning | Unit | Value Range | Bits |
|-----|------|---------|------|-------------|------|
| 16 | GX2 | spacer lines to the next field (X) in area 2 | numerical value | 0 | 32 |
|  | GY2 | spacer columns to the next field (Y) in area 2 | numerical value | 0 |  |
|  | SP1 | sector size in area 1 | bytes | 560 |  |
| 17 | SP2 | sector size in area 2 | bytes | 0 | 32 |
| 18 | FAFN | first field number with analog data | numerical value | 0 | 32 |
|  | FUFN | first field number without data | numerical value | 0 |  |

The microform 2 with the values given above for the individual parameters of the file system comprises only one area.

This very simple case of a digital microform 2 according to FIG. 12 contains only a single data field D1 with the dimensions:

(LPF1−$GX$1)×(CPF1−$GY$1)=6,800×4,480 data cells

The data cells contain not only useful data but also, as usual and necessary in data processing, additional data containing address information and information on data security (error recognition and error correction). The useful data (UserData) also include the data which are necessary for the generation of the file system. In this example, let each sector have the following structure:

| sector: 560 bytes | | | | | | | |
|---|---|---|---|---|---|---|---|
| | Header | | | | | | |
| Sync | Sector Address | Mode | User Data | EDC | Intermediate | P-parity | Q-parity |
| Bytes 12 | 3 | 1 | 256 | 4 | 8 | 172 | 104 |

Sync field: always consists of the bit sequence x00FFFFFFFFFFFFFFFFFFFF00.
Header field: a sector address of three bytes and one mode byte (x01).
User data: useful data.
EDC: error detection and correction: this field is set up according to ECMA-130.
Intermediate: consists of the bit sequence x000000000000.
P-parity: corresponding to ECMA-130, Appendix A.
Q-parity: corresponding to ECMA-130, Appendix A.

For a sector size of SP1=560 bytes=4,480 bits, the amount of useful data which results is then 256 per line.

The sectors are arranged continuously in the x direction in order of increasing field number; in the exemplary embodiment, there is only 1 field. Each individual stored therefore has its own uniquely assigned location, which forms the prerequisite for the implementation of a file system (e.g., UDF).

The data density is calculated as follows:

max(LPF1/$DK$12$X$,CPF1/$DK$12$Y$)~50.4 pixels/mm=1, 280 pixels/inch

This value can already be achieved with conventional optoelectronic scanning units (CCDs) and lasers for writing to the microform 2.

The useful data volume of the microfilm 2 thus designed can then be calculated as follows:

$V_1$=$N$1$X$×$N$1$Y$×(LPF1□$GX$1)×256 bytes=1×1×6,800× 256 bytes=1,740,800 bytes~1.66 MB.

If the way in which the digital data are stored involves not only binary values, i.e., 0=transparent, 1=black, that is, if a color matrix with 32,768 color grades, for example, is used for coding (R, G, and B, each with a color depth of 5 bits), then the user data storage capacity $V_2$ of this microform is:

$$V_2 = 15 \times V_1 = 26{,}112{,}000 \text{ bytes} = 24.90 \text{ } MB$$

$$(1 \text{ } GB = 1{,}024 \text{ } MB, 1 \text{ } MB = 1{,}024 \text{ } KB, 1 \text{ } KB = 1{,}024 \text{ } bytes)$$

If, for the storage of the digital data, a color matrix with 16,777,216 color grades is used (R, G, B, each with a color depth of 8 bits), the user data storage capacity $V_3$ of this microform is:

$$V_3 = 24 \times V_1 = 41{,}779{,}200 \text{ bytes} = 39.8 \text{ } MB$$

These sample calculations for storage capacity illustrate the excellent suitability of the microform for long-term archival of large inventories of digital data.

With the current prior art, structures of 2 μm can be realized on microforms. For a microfiche with an area of 141 mm×94 mm, this results in 3,313,500,000 pixels and a gross capacity of:

$$V_4 = 24 \times 3{,}313{,}500{,}000 \text{ bits}$$
$$= 79{,}524{,}000{,}000 \text{ bits}$$
$$= 9{,}940{,}500{,}000 \text{ bytes}$$
$$= 9{,}480 \text{ } MB$$
$$= 9.26 \text{ } GB$$

The invention claimed is:

1. A method for reading at least one of analog and digital data stored in fields on a microform by means of a device for accessing the microform which is connected to a data processing system by a hardware interface, the method comprising:
   reading, by a control unit of the device, the at least one of analog and digital data stored on the microform; and
   presenting, by the control unit, the at least one of analog and digital data stored on the microform to the data processing system as if the microform were a conventional removable data storage medium, and one of:
   when the microform includes exclusively analog data, generating, by the control unit, a file system corresponding to a removable data storage medium from the information on the arrangement and number of fields containing analog data acquired by a complete scan of the microform and storing the file system in a memory of the control unit;

when the microform includes one of exclusively digital data and digital and analog data, reading by the control unit information on the structure and type of data storage from one of a format field identifiable on the microform and from at least one of the digital data fields, generating from the information on the structure and type of data storage a file system corresponding to a removable data storage medium, and storing the file system in the memory of the control unit; and when the microform includes exclusively analog data, reading by the control unit information on the arrangement and number of fields containing analog data from a format field identifiable on the microform, generating from the information on the arrangement and number of fields containing analog data a file system corresponding to a removable data storage medium, and storing the file system in the memory (RAM) of the control unit.

2. The method according to claim 1, further comprising:
conducting a first scan of the microform present in the device at least in a predetermined area of the microform;
if no format field is found during the first scan, assuming, by the control unit that the microform contains exclusively analog data, and
when the microform includes exclusively analog data, generating, by the control unit, a file system corresponding to a removable data storage medium from the information on the arrangement and number of fields containing analog data acquired by a complete scan of the microform and storing the file system in a memory of the control unit;
if a format field is found during the first scan, assuming by the control unit that the microform contains one of exclusively digital data, digital and analog data, or exclusively analog data, and
wherein, when the microform includes one of exclusively digital data and digital and analog data, reading by the control unit information on the structure and type of data storage from one of a format field identifiable on the microform and from at least one of the digital data fields, generating from the information on the structure and type of data storage a file system corresponding to a removable data storage medium, and storing the file system in the memory of the control unit; and
wherein when the microform includes exclusively analog data, reading by the control unit information on the arrangement and number of fields containing analog data from a format field identifiable on the microform, generating from the information on the arrangement and number of fields containing analog data a file system corresponding to a removable data storage medium, and storing the file system in the memory (RAM) of the control unit.

3. The method according to claim 1, further comprising:
upon receipt of a read command from the data processing system requesting data, determining by the control unit whether the requested data are already in the memory of the control unit;
if the requested data are already in the memory of the control unit, then sending by the control unit the requested data to the data processing system;
if the requested data are not in the memory of the control unit, then determining by the control unit which individual fields of the microform must be scanned to acquire the requested data based on the file system, and executing a scan of the individual fields; and
converting by the control unit the at least one of analog and digital data of the microform acquired during the scan of individual fields into a data format conforming to the generated file system and sending the at least one of analog and digital data of the microform acquired during the scan of individual fields as output to the data processing system.

4. The method according to claim 1, further comprising:
upon receipt of a read command from the data processing system requesting data, determining by the control unit whether the requested data are already in the memory of the control unit;
if the requested data are already in the memory of the control unit, then sending by the control unit the requested data to the data processing system;
if the requested data are not in the memory of the control unit, then determining by the control unit which individual fields of the microform must be scanned to acquire the requested data based on the file system, and executing a scan of the individual fields; and
converting by the control unit the at least one of analog and digital data of the microform acquired during the scan of individual fields into a data format conforming to the generated file system and sending the at least one of analog and digital data of the microform acquired during the scan of individual fields as output to the data processing system.

5. The method according to claim 1, further comprising:
upon receipt of a write command from the data processing system, determining by the control unit whether a writable microform is present in the device, and
if a writable microform is present, then writing data transferred from the data processing system to the device onto the microform.

6. The method according to claim 1, wherein the conventional removable data storage medium is selected from the group of storage media including magnetic storage media, optical storage media, magneto-optical storage media, and flash EEPROM storage media.

7. A device for accessing a microform with at least one of analog and digital data stored in fields, the device comprising:
a unit for drawing the microform into a receiving slot of the device and ejecting the microform from the receiving slot;
at least one scanning unit for scanning the microform received in the device, the scanning unit comprising at least one electromagnetic radiation source arranged on one side of the microform and at least one electronic sensor on an opposing side of the microform, said at least one electronic sensor converting the different degrees of transparency of the microfiche film of the microform to the electromagnetic radiation into electrical signals; and
a program-controlled control unit configured to receive the at least one of analog and digital data stored on the microfilm acquired by the scanning unit and to present the at least one of analog and digital data stored on the microform to a data processing system (PC) in the form of data on a conventional removable data storage medium, wherein the control unit comprises a read-only memory; a working memory, which simultaneously serves as a memory for the data to be read in from the microform and for a file system; a nonvolatile, rewritable memory for the control program of the control unit; and the following peripheral components:

a CCD peripheral component for reading the sensor signals of the scanning unit, for assigning the sensor signals to an associated reading location, and for storing the sensor signals in the working memory;

an LED peripheral component for controlling a brightness of the at least one electromagnetic radiation source; and an I/O peripheral component for controlling the unit for drawing in and ejecting the microform and for controlling the drive which moves the scanning unit.

8. The device according to claim 7, further comprising a writing unit controlled by the control unit for writing data onto the microform which can be drawn into the receiving slot.

9. The device according to claim 8, wherein the control unit further comprises a LASER peripheral component for controlling the writing unit.

10. The device according to claim 7, wherein the conventional removable data storage medium is selected from the group of storage media including magnetic storage media, optical storage media, magneto-optical storage media, and flash EEPROM storage media.

11. A microform with at least one of analog and digital data stored in fields receivable in a device comprising:

a unit for drawing the microform into a receiving slot of the device and ejecting the microform from the receiving slot;

at least one scanning unit for scanning the microform received in the device, the scanning unit comprising at least one electromagnetic radiation source arranged on one side of the microform and at least one electronic sensor on an opposing side of the microform, said at least one electronic sensor converting the different degrees of transparency of the microfiche film of the microform to the electromagnetic radiation into electrical signals; and a program-controlled control unit configured to receive the at least one of analog and digital data stored on the microfilm acquired by the scanning unit and to present the at least one of analog and digital data stored on the microform to a data processing system (PC) in the form of data on a conventional removable data storage medium, wherein the control unit comprises a read-only memory; a working memory, which simultaneously serves as a memory for the data to be read in from the microform and for a file system; a nonvolatile, rewritable memory for the control program of the control unit; and the following peripheral components:

a CCD peripheral component for reading the sensor signals of the scanning unit, for assigning the sensor signals to an associated reading location, and for storing the sensor signals in the working memory;

an LED peripheral component for controlling a brightness of the at least one electromagnetic radiation source; and an I/O peripheral component for controlling the unit for drawing in and electing the microform and for controlling the drive which moves the scanning unit, the microform comprising:

a format field identifiable by the scanning unit of the device and at least one field for the storage of the at least one of digital and analog data, wherein the format field comprises information on the structure and type of data storage, wherein both the format field and the data-storage fields, which have the same shape and size in certain areas, are arranged in rows and columns in a grid, and wherein the grid comprises the data-storage fields arranged in series in rows or columns for the storage of digital data and fields arranged in series in rows or columns for the storage of analog data; and the format field comprises structure information pertaining at least to the position of the individual fields on the microform, to the number of data-storage fields, to the number of columns and rows of data cells of each field of the data-storage fields, to the arrangement of the first field with analog data, and to the size of the data blocks which can be addressed in the fields for the storage of digital data.

12. The microform according to claim 11, wherein the format field is located in the upper left corner of the grid.

* * * * *